(12) United States Patent
Etchegoyen (10) Patent No.: US 8,769,296 B2
(45) Date of Patent: Jul. 1, 2014

(54) SOFTWARE SIGNATURE TRACKING

(75) Inventor: Craig S. Etchegoyen, Irvine, CA (US)

(73) Assignee: Uniloc Luxembourg, S.A., Luxembourg (LU)

( * ) Notice: Subject to any disclaimer, the term of this patent is extended or adjusted under 35 U.S.C. 154(b) by 433 days.

(21) Appl. No.: 12/903,980

(22) Filed: Oct. 13, 2010

(65) Prior Publication Data

US 2011/0093701 A1 Apr. 21, 2011

Related U.S. Application Data

(60) Provisional application No. 61/252,983, filed on Oct. 19, 2009.

(51) Int. Cl.
G06F 21/00 (2013.01)

(52) U.S. Cl.
USPC ............. 713/187; 713/165; 713/176; 726/22; 726/26

(58) Field of Classification Search
USPC .............................. 713/165, 176, 187; 726/26
See application file for complete search history.

(56) References Cited

U.S. PATENT DOCUMENTS

| | | | |
|---|---|---|---|
| 4,120,030 A | 10/1978 | Johnstone | |
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,155,847 A | 10/1992 | Kirouac et al. | |
| 5,210,795 A | 5/1993 | Lipner et al. | |
| 5,291,598 A | 3/1994 | Grundy | |
| 5,414,269 A | 5/1995 | Takahashi | |

(Continued)

FOREIGN PATENT DOCUMENTS

| | | |
|---|---|---|
| AU | 678985 | 6/1997 |
| EP | 1 637 958 | 3/2006 |

(Continued)

OTHER PUBLICATIONS

"Watermarking Software to Signal Copy Protection" Jeges et al ,Computer Network Security Communications in Computer and Information Science, 2007, vol. 1, Part 7, Part 12, 408-413.*

(Continued)

*Primary Examiner* — Jason Lee
(74) *Attorney, Agent, or Firm* — Sean D. Burdick (57) ABSTRACT

A method for preventing unauthorized use of software may be achieved by executing computer-readable code with instructions for recording an indication of at least one selected file of a software application in a memory location accessible to a security component of the software application, in which software application the security component is configured to cause a hash signature of the at least one selected file to be generated in response to a signal arising from use of the software application, hashing the at least one selected file to generate a first file signature, transmitting the first file signature to a secure network-accessible computer memory for storage and subsequent comparison to at least one subsequent file signature generated via operation of the security component on a client device, comparing the first file signature to a second file signature generated by the security component in response to a signal arising from use of the software application on the client device, and disabling the software application on the client device, in response to determining that the first file signature does not match the second file signature.

14 Claims, 6 Drawing Sheets

(56) References Cited

U.S. PATENT DOCUMENTS

| | | | |
|---|---|---|---|
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,893,910 A * | 4/1999 | Martineau et al. | 1/1 |
| 5,925,127 A | 7/1999 | Ahmad | |
| 5,970,143 A | 10/1999 | Schneier et al. | |
| 5,974,150 A | 10/1999 | Kaish et al. | |
| 6,006,328 A | 12/1999 | Drake | |
| 6,009,401 A | 12/1999 | Horstmann | |
| 6,009,525 A | 12/1999 | Horstmann | |
| 6,044,471 A | 3/2000 | Colvin | |
| 6,158,005 A | 12/2000 | Bharathan et al. | |
| 6,169,976 B1 * | 1/2001 | Colosso | 705/59 |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,484,182 B1 | 11/2002 | Dunphy et al. | |
| 6,536,005 B1 | 3/2003 | Augarten | |
| 6,785,825 B2 | 8/2004 | Colvin | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 7,032,110 B1 | 4/2006 | Su et al. | |
| 7,051,211 B1 | 5/2006 | Matyas, Jr. et al. | |
| 7,069,440 B2 | 6/2006 | Aull | |
| 7,069,595 B2 | 6/2006 | Cogmigni et al. | |
| 7,085,741 B2 | 8/2006 | Lao et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,263,606 B2 | 8/2007 | Elteto | |
| 7,272,728 B2 | 9/2007 | Pierson et al. | |
| 7,287,166 B1 | 10/2007 | Chang et al. | |
| 7,319,987 B1 | 1/2008 | Hoffman et al. | |
| 7,327,280 B2 | 2/2008 | Bachelder et al. | |
| 7,328,453 B2 | 2/2008 | Merkle et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,653,899 B1 | 1/2010 | Lindahl et al. | |
| 8,474,038 B1 * | 6/2013 | Wong | 726/22 |
| 2001/0034712 A1 | 10/2001 | Colvin | |
| 2001/0034846 A1 | 10/2001 | Beery | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0065918 A1 | 4/2003 | Wiley | |
| 2003/0084306 A1 | 5/2003 | Abburi et al. | |
| 2003/0172035 A1 | 9/2003 | Cronce et al. | |
| 2003/0191938 A1 | 10/2003 | Woods et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0083469 A1 | 4/2004 | Chen et al. | |
| 2004/0143746 A1 | 7/2004 | Ligeti et al. | |
| 2004/0148601 A1 | 7/2004 | Kroening | |
| 2004/0187018 A1 | 9/2004 | Owen et al. | |
| 2004/0215661 A1 | 10/2004 | Zhang et al. | |
| 2005/0004954 A1 | 1/2005 | Soule, III | |
| 2005/0108173 A1 | 5/2005 | Stefik et al. | |
| 2005/0132070 A1 | 6/2005 | Redlich et al. | |
| 2005/0138155 A1 | 6/2005 | Lewis | |
| 2005/0172280 A1 | 8/2005 | Ziegler et al. | |
| 2006/0064756 A1 * | 3/2006 | Ebert | 726/26 |
| 2006/0072444 A1 | 4/2006 | Engle et al. | |
| 2006/0095454 A1 | 5/2006 | Shankar et al. | |
| 2006/0161914 A1 | 7/2006 | Morrison et al. | |
| 2006/0265337 A1 | 11/2006 | Wesinger, Jr. et al. | |
| 2006/0282660 A1 | 12/2006 | Varghese et al. | |
| 2007/0100690 A1 | 5/2007 | Hopkins | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0220500 A1 | 9/2007 | Saunier | |
| 2007/0234409 A1 | 10/2007 | Eisen | |
| 2007/0239606 A1 | 10/2007 | Eisen | |
| 2007/0282615 A1 | 12/2007 | Hamilton et al. | |
| 2008/0005655 A1 | 1/2008 | Sankaran et al. | |
| 2008/0065552 A1 | 3/2008 | Elazar et al. | |
| 2008/0086423 A1 | 4/2008 | Waites | |
| 2008/0147556 A1 | 6/2008 | Smith et al. | |
| 2008/0228578 A1 | 9/2008 | Mashinsky | |
| 2008/0320607 A1 | 12/2008 | Richardson | |
| 2009/0077390 A1 | 3/2009 | Cobelo et al. | |
| 2009/0083730 A1 | 3/2009 | Richardson | |
| 2009/0089869 A1 | 4/2009 | Varghese | |
| 2009/0138975 A1 | 5/2009 | Richardson | |
| 2009/0150330 A1 | 6/2009 | Gobeyn | |
| 2009/0204661 A1 | 8/2009 | Endo et al. | |
| 2009/0292816 A1 | 11/2009 | Etchegoyen et al. | |
| 2010/0037062 A1 * | 2/2010 | Carney | 713/176 |

FOREIGN PATENT DOCUMENTS

| | | |
|---|---|---|
| EP | 1 637 961 | 3/2006 |
| EP | 1 670 188 | 6/2006 |
| EP | 2 267 629 | 12/2010 |
| EP | 2 270 737 | 1/2011 |
| EP | 2 273 438 | 1/2011 |
| WO | WO 92/20022 | 11/1992 |
| WO | WO 93/01550 | 1/1993 |
| WO | WO 95/35533 | 12/1995 |
| WO | WO 00/67095 | 11/2000 |
| WO | WO 2005/104686 | 11/2005 |
| WO | WO 2007/060516 | 5/2007 |
| WO | WO 2008/013504 | 1/2008 |
| WO | WO 2008/034900 | 3/2008 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |

OTHER PUBLICATIONS

"Dynamic taint analysis for automatic detection, analysis, and signature generation of exploits on commodity software"; Newsome et al; Dept of Electrical and computer engineering, Carnegie Institute of Technology, 2005, 18 pages.*

"Technical Details on Microsoft Product Activation for Windows XP," Internet Citation, XP002398930, Aug. 13, 2001.

Angha et al.; "Securing Transportation Network Infrastructure with Patented Technology of Device Locking—Developed by Uniloc USA", http://www.dkassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Johnson et al. "Dimensions of Online Behavior: Toward a User Typology," *Cyberpsycology and Behavior*, vol. 10, No. 6, pp. 773-779, 2007. XP002617349.

Lallous, "Changing Volume's Serial Number," Code Project Feb. 17, 2008, retreived from the internet on Dec. 14, 2010. XP002614149.

Lee P, "Oracle Adaptive Access Manager Reference Guide, Release 10g (10.1.4.5)," May 2009, Internet Article retrieved on Sep. 27, 2010. XP002603489.

(56) References Cited

OTHER PUBLICATIONS

Wikipedia: "Device Fingerprint," May 5, 2009, modified Jan. 20, 2011, Internet Article retrieved on Apr. 19, 2011.

Wikipedia: "Software Extension," May 28, 2009, Internet Article retrieved on Oct. 11, 2010. XP002604710.

Williams et al., "Web Database Applications with PHP & MySQL," *O'Reilly Media Chapter 1. Database Applications and the Web* Mar. 2002, Internet Article retrieved on Sep. 21, 2010. XP002603488.

Williams, R., "A Painless Guide to CRC Error Detection Algorithms," Aug. 13, 1993, 33 pages, www.ross.net/crc/download/crc_v3.txt.

Held, Gilbert, "Understanding Data Communications," *Convolutional Coding-Cyclic Redundancy Checks*, Third Edition, pp. 220-221, SAMS A division of Prentice Hall Computer Publishing, Indiana 46032 USA.

Watermarking Software to Signal Copy Protection, Journal Article, Dec. 31, 2007.

* cited by examiner

SOFTWARE SIGNATURE TRACKING

This application claims priority to U.S. Provisional Application No. 61/252,983 which was filed Oct. 19, 2009 and which is fully incorporated herein by reference.

BACKGROUND

1. Field of the Invention

The present invention relates to methods and systems for protection and tracking use of computer software. More specifically, the invention relates to identifying software for protection and tracking purposes by deriving a characteristic signature from the software.

2. Description of Related Art

Various methods are known in the art for preventing unauthorized duplication and use of software and other copyrighted digital content. While most such methods are at least partially effective in preventing piracy, many copyright software methods can be defeated by the persistent efforts of skilled individuals—sometimes called "hackers"—with expertise in computer systems and programming. Such hackers are sometimes able to modify distributed copies of software to disable its copyright protection features, so that the modified software can be freely copied or used without license restrictions, while still retaining its essential functionality. Software in which protection features are thusly disabled is sometimes referred to as being "cracked."

The existence of cracked software versions may create a risk of unauthorized or illegal distribution and use, which may harm legitimate software providers. Besides causing loss of licensing revenue, cracked software versions may not function as originally designed, which may harm user's perception of the software provider's quality control. For these and other reasons, it is desirable to detect and prevent the spread of cracked software or other digital content. Current methods for detecting and preventing the spread of cracked software include human monitoring of software distribution channels to detect and track illegally modified software versions. However, such monitoring is relatively expensive and inefficient, and may not provide sufficient (or any) control over use of cracked software even after it is detected. It is therefore desirable to provide improved methods for detecting and controlling distribution and use of software or other digital content that has been tampered with, such as by removing copyright protection features.

SUMMARY

The present disclosure describes systems and methods for enabling software signature tracking in conjunction with client machine identifiers and distributed code, by software developers.

Prior to release of software under development, developers may "wrap" an application to provide copyright protection features such as, for example, encryption of code requiring a security key. Less robust security wrappers may add security features after software is completed and compiled, using separate security tools. More robust security wrappers integrate security features in the program code, and may be compiled together with application program code. To ease programming burdens on software developers, providers of security wrapping tools may implement security wrapping tools through an interface that is coordinated with or includes a component for development of source code.

In accordance with the foregoing, an application to be protected may be configured with a protected security component. The protected security component comprises code that is protected from reverse-engineering, from being disabled, or from being deleted using any suitable software protection method or combination of methods, for example, encryption, physical device detection, obfuscation, and tripwires. The protected security component may be integrated into the application software to be protected so that it cannot be deleted or disabled without impairing or disabling the protected application. In some embodiments, the protected security component is configured and integrated with the application software to be protected using a supplied security wrapping application. As part of the configuration process, the security wrapping application may receive as input an identifier, such as, for example, a file name, for one or more files chosen to be the signature root by the software developer. A file selected to be the signature root may be, for example, a critical executable file making up part or essentially all of the application to be protected.

Once the signature root file has been selected, the security wrapping application may process the root file using a predetermined secret hash to generate a file signature. Any suitable hashing algorithm may be used to generate the signature such as, for example, a cryptographic MD5, SHA-1, or SHA-2 hash. The file signature resulting from the hashing process may be securely transmitted to a network-accessible database. For greater security, the file signature should not be included in the securely wrapped software application.

The protected application may also be wrapped with a protected client application security component that may be configured to operate on client devices after distribution of the protected application. The client application security component is configured to operate as follows in response to execution of the protected application on a client device. First, the security component regenerates the file signature using the hashing algorithm operating on the signature root file. Next, the security component determines whether the file signature has changed since the last time that the protected application has run on the client device. This may be done, for example, by comparing the regenerated file signature with a stored file signature generated at an earlier time, e.g., prior to software release. To reduce risk of a security breach, the client security application may be configured to perform the comparison by transmitting the regenerated signature to a secure remote site, together with another identifier for the protected application and optionally, a machine fingerprint for the client device running the protected application. The secure remote site may access a secure database of signatures using the identifier for the application to determine one or more past authorized signatures for the protected application. The secure remote site may compare the regenerated signature with the one or more past authorized signatures and communicate a result, for example, "match to version 1.1," or "no match," to the client security component.

The client security component may take a designated security action in response to the results from the comparison. For example, if the signature does not match any authorized software version, the client-side security application may display an error message and disable normal operation of the protected application. For further example, the security application may display a message alerting the user that a software update is recommended or required, when the regenerated signature matches a signature for an outdated software version while not matching the signature for the most current software version.

Software signature data communicated to a server site by numerous client-side security applications can be used to generate version information reports to any interested parties.

For example, software publishers may be alerted when new file signatures appear at client machines prior to version release, or if not matching any authorized file signature. Such events may be interpreted as indicating unauthorized pre-release leaks or software tampering, respectively. Version tracking statistics can also be collected and reported, both for authorized software versions and unauthorized (e.g., cracked) software versions.

A more complete understanding of software signature tracking will be afforded to those skilled in the art, as well as a realization of additional advantages and objects thereof, by a consideration of the following detailed description. Reference will be made to the appended sheets of drawings which will first be described briefly.

DETAILED DESCRIPTION OF THE INVENTION

Figure 1:
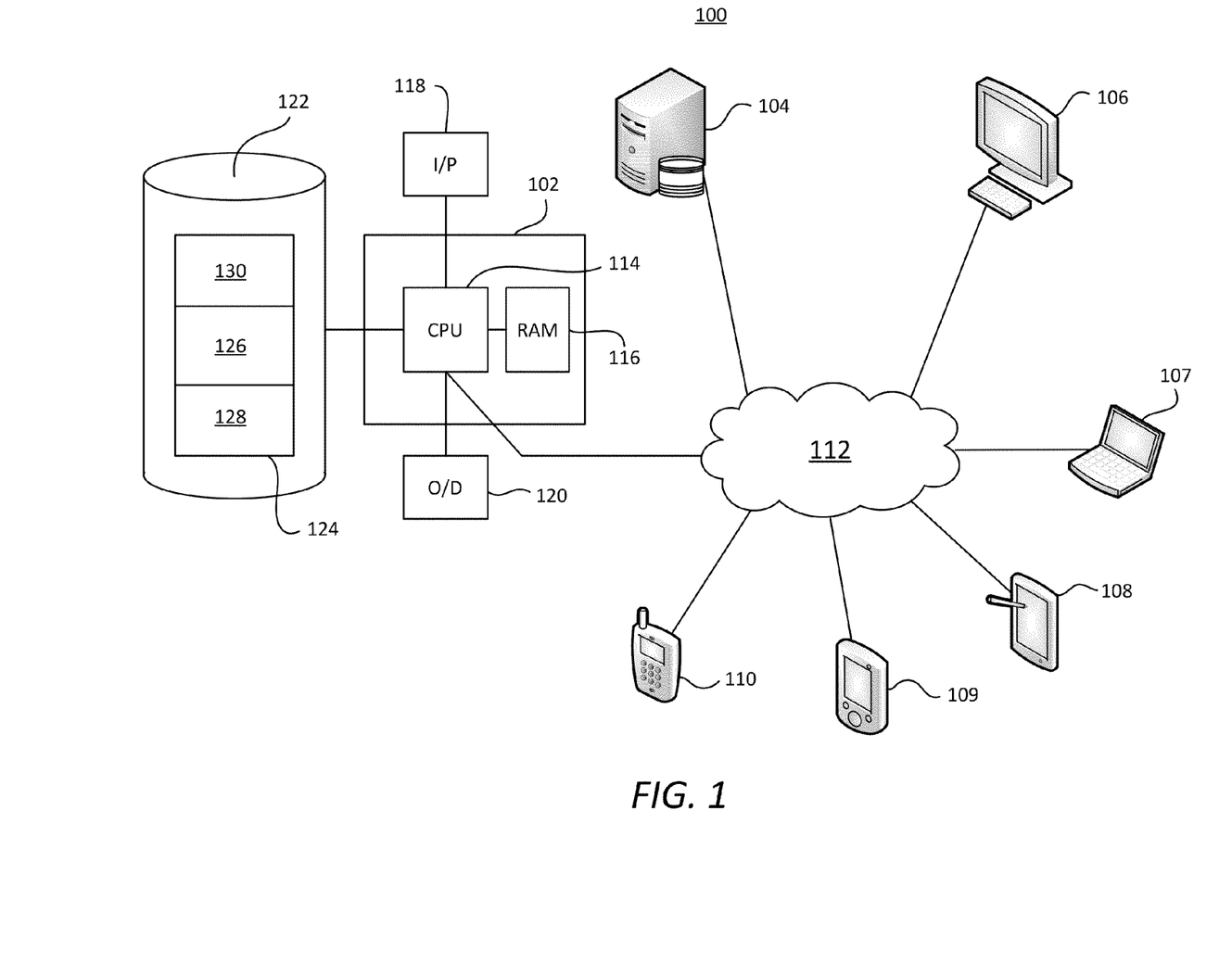
FIG. 1 is a block diagram showing an example of a system in which an embodiment of a software signature tracking method may be implemented according to the invention.

FIG. 1 shows an example of a system 100 in which a developer node 102 communicates with an administrative node 104 and numerous client nodes 106-110 using a network 112. Each of the developer node, administrative node, and client nodes may comprise at least one computing device including a processor and memory device, a user input device and a display or other output device. By way of example, clients 106-110 may have various form factors and functions, such as a personal computer 106, portable computer 107, notebook or pen computer 108, PDA 109, or mobile phone 110. Such clients are capable of communicating over wide area networks and other communications networks to share data, as well as storing and executing software applications to provide various functions for respective end users. The methods disclosed herein may be adapted for use with any of these or similar clients.

Developer node 102 may similarly comprise a processor 114 configured to execute program instructions stored in a memory 116 to perform processing functions in response to input from an input device 118, such as a keyboard, touchscreen, microphone, or the like. The processor may direct output to an output device 120, for example, a computer monitor or display screen. The processor 114 may also be in communication with a storage device 122, for example, an HDD, holding a set of computer files 124 making up a software application. The software application 124 comprises at least one executable file 126, a security component 128, and any non-zero number of other or ancillary files 130, encoded in a computer-readable medium. The administrative node 104 may comprise similar components. The developer node, administrative node, and client nodes may each comprise any non-zero number of processors and computers.

Figure 2:
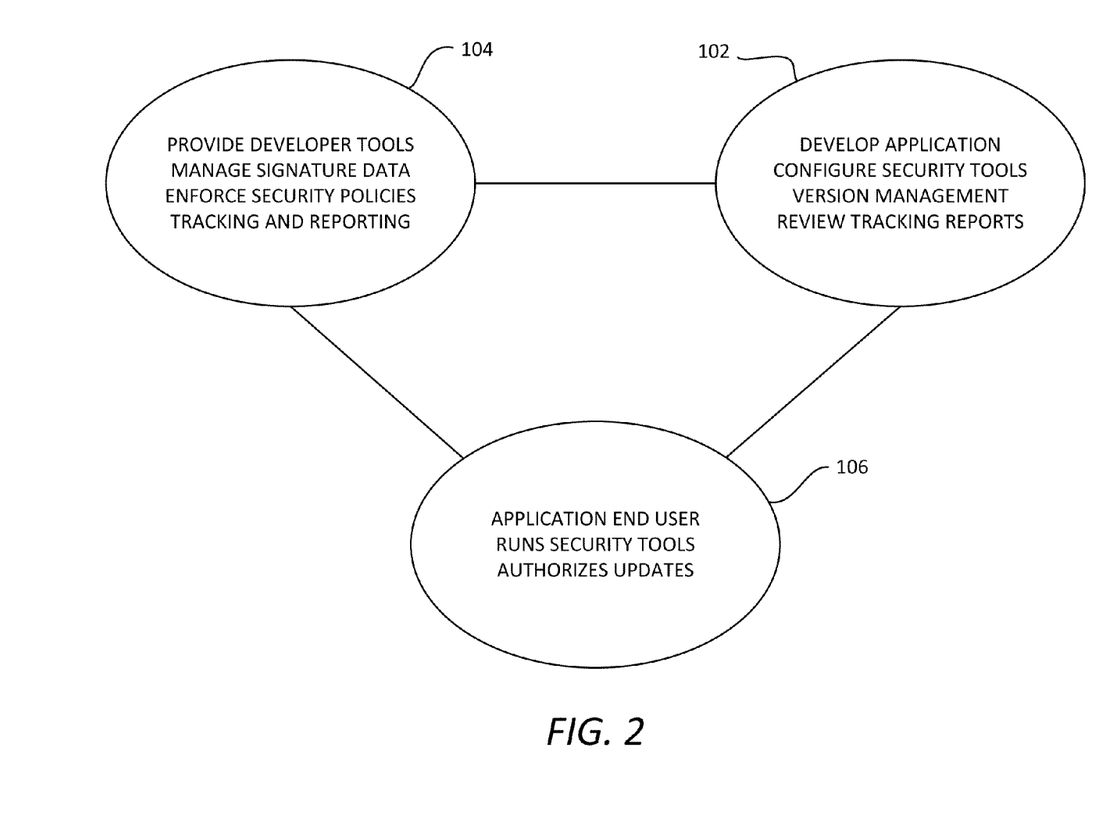
FIG. 2 is a functional block diagram showing an example of how various functions may be distributed in methods or systems for software signature tracking according to the present invention.

FIG. 2 illustrates how functions may be distributed between the various nodes described above. The administrative node 104 may include at least one computer operated to perform the functions of: (1) providing software security tools for developers to add the software signature tracking functions described herein; (2) managing software signature data generated by the software signature tracking functions on various clients; (3) enforcing security policies set by the developer when software signature tracking indicates one or more clients is in violation of license terms; and (4) tracking distribution and use of software versions by the various client devices using the software application 124. These functions may be performed using application software and/or firmware operating on one or more computers in communication with client nodes 106 and developer nodes 102.

Software security tools, as used herein, includes specialized software components configured for integration in or with software application, to perform the software signature tracking as described herein and any other desired security functions, for example, key control and physical device tracking. In brief, physical device tracking security tools use measurements of physical device parameters as part of a security algorithm to prevent unauthorized copying of software to unlicensed physical devices. Physical device tracking is most effectively implemented probabilistically using numerous device parameters to determine a machine fingerprint for a particular device. Changes in the machine fingerprint that fall below a specified difference threshold do not trigger security restrictions in probabilistic implementations. Conversely, changes in the machine fingerprint that exceed the specified difference threshold do trigger security restrictions. In other words, minor changes in device configuration are tolerated as being less likely to indicate use of licensed software on an entirely new machine, while more significant changes in a machine fingerprint are interpreted as indicating that the licensed software has been copied to a new machine. Software signature tracking may, in the alternative, be implemented in a security application without physical device tracking. Physical device tracking as referenced above is described more fully in U.S. Pat. No. 5,490,216 and in U.S. Provisional Application Ser. No. 61/218,558, both of which are fully incorporated herein by reference.

Security features as disclosed herein may be implemented as part of a suite of integrated or non-integrated security wrapping tools provided by an administrative node 104. For example, the described features may be integrated into other application software using a supplied suite of security wrapping tools. However, the present technology is not limited by this example. In the alternative, and for further example, these features may be coded by hand during any application development process.

Managing signature data may also be performed by the administrative node 104. Signature data includes hashed signature data and any associated software application information, descriptive text, dates, times, physical device identifiers, and other data. Such data may be managed at an administrative node by updating one or more databases with qualified data, receiving queries and incoming data, determining whether incoming data is qualified for inclusion in its database, responding to queries and incoming data, and performing routine database management tasks. The administrative node may store and manage data for numerous different software applications and versions, including both unauthorized and authorized versions. Each application and version pair may be associated with a hashed signature, textual description, software application identifier, developer information, signature date and other metadata, in a database or other data structure. New software signatures for new versions may be added by developers; in addition, new signatures indicating unauthorized versions may be discovered by client-side security components and reported to the database. Signature data reported by client-side security components may be included in the database in association with metadata identifying the application, network address, physical device identifier, geographic location, and other data describing the client or clients on which the new signature was discovered, together with a time and date of first discovery. Such data may be useful in tracking distribution of software versions, both unauthorized and authorized, among a client population, as well as for license enforcement.

Another function of the administrative node 104 may be to enforce security policies and/or license provisions defined by software publishers, in response to discovery of unauthorized software versions on one or more clients. Physical device identifiers, assigned client device identifiers, network addresses, or user account identifiers may be used to prevent access by clients operating unauthorized versions to local or network resources requested by the unauthorized software version, thereby at least partially disabling its operation. For example, an administrative node may maintain a database of client identification data as an electronic "blacklist" for clients operating unauthorized software versions. Network resource providers may filter incoming resource requests from clients using the database to identify any blacklisted clients, and deny access to the network resource to some clients. For further example, use of local resources including program files and data may be denied by the administrative node sending a signal to a client on which an unauthorized version is detected. A "trap door," i.e., hidden software routine, may detect the signal and reconfigure system variables so as to disable the software application.

The administrative node may also generate and distribute tracking reports based on software signature data. Such reports enable software publishers and others to see relationships and distribution patterns for various software versions within a population of client devices. Reports may be generated using the database of signature and associated data maintained by the administrative node.

One or more developer nodes 102 may include at least one computer operated to perform the functions of: (1) developing software applications to be used with the signature tracking components and methods as disclosed herein; (2) configuring the signature tracking tools provided from an administrative node to operate with particular application versions; (3) managing and coordinating the registration of software signatures for each authorized version, optionally including registration of unreleased versions; and (4) receiving, reviewing, and responding to version tracking reports provided from the administrative node. Software development may generally be performed independently of the administrative node and as such, is not within the scope of the present disclosure. The present technology may be useful with a wide variety of applications developed for diverse computing platforms and clients.

During or after software application development, software developers may, using a software development tool or by manual programming, specify control variables and initiate configuration actions for different software versions. For example, the developer node may operate to specify one or more files for each application to be hashed to generate a signature, and initiate a hashing function to generate a signature using the specified file or files as input. Furthermore, the developer node may integrate and configure client-side signature tracking components of the application, as part of an application development process. The client-side signature tracking components may be developed and supplied via the administrative node, and integrated at a developer node with application code.

The developer node may also be used to register completed signature values and associated metadata with a tracking database, such as by transmitting the signature values and metadata to the administrative node or other designated data storage resource. Metadata accompanying the signature values may include, for example, a textual description of the application and version to which the signature relates, date and time each signature is generated, identity of the developer node, and one or more addresses to receive tracking reports. As part of a registration process with an administrative node, the developer node may also specify enforcement actions to be taken in response to detection of unauthorized software versions, and configure network resources and/or the software application to enable operation of the specified enforcement actions.

Once signature tracking has been configured for an initial version of a software application, the developer node may similarly configure signature tracking for each subsequently application version to be released, if any. The developer node may configure tracking for each subsequent application version using the same process as used for an initial release version. A signature tracking record may be created for each subsequent version in the signature database. In this way, the signature tracking system supports tracking of later versions while retaining tracking capability for earlier released versions of an application.

After releasing an application version and configuring signature tracking for it, the developer node may receive tracking reports from the administrative node reporting on use of the signed application. The tracking reports may include identifying installations and use events for the released application, broken down by geographic region, date, client type, user account type, or other desired categories. The reports may also identify any installation or use event for new unauthorized software versions, also organized by category. As used herein, a "use event" for application software refers to any event that is defined as recordable or reportable for the client-side signature tracking component; for example, a call to load the tracked executable file into random access memory for execution by the client processor, or use of the tracked executable to perform a defined task, such as, for example, joining a multi-user remote game instance.

Client node 106 exemplifies functions that may be performed on various types of client nodes. Each client node is an end user of the tracked software application, and makes use of the application in a way that triggers operation of the application's software tracking component, sometime called a security component. Each client provides a platform for operation of the application's tracking component after each such triggering event. In general, operation of the tracking component is automated. Once its operation is triggered by the user causing occurrence of a use event, user input is not required at the client for the tracking component to operate at the client. The client-side tracking component may operate in coordination with a remote application operating at an administrative node to perform a reporting and tracking function, as described in more detail herein. Another function of the client node may be to authorize updates to software versions when an outdated or unauthorized version is detected at the client.

In the alternative, updates may be performed automatically is permitted by the applicable license agreement.

Figure 3:
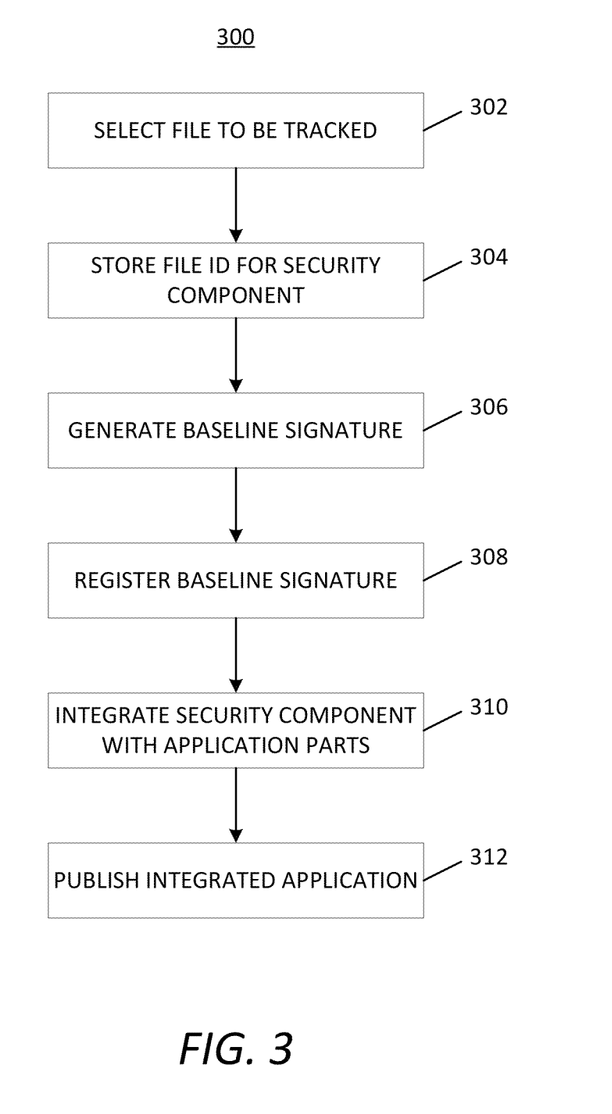
FIG. 3 is a process flow chart showing one embodiment of a method according to the invention for software signature tracking at a software developer node.

FIG. 3 shows an example of a method 300 for software signature tracking at a software developer node. Method 300 may be performed by a computer operating program instructions, which may be configured as software using any suitable programming method and encoded on a computer-readable medium. Certain portions of the method revolve responses to inputs received from any suitable user interface device or from a cooperating computing or electronic memory device, as should be apparent from the accompanying description.

Initially, a user of the developer node may select 302 one or more executable files to be tracked using software signature tracking as disclosed herein. In general, software applications may comprise numerous different files, of both executable and non-executable types, required to operate the application. Of these, a developer may select at least one file, preferably an executable file that is important or critical to operation of the application as a whole, to be tracked using signature registration. An interface application operating on the developer node may select the file to be tracked in response to input from a user input device.

Once selected, the developer node may record an identifier for the selected file 304, for example, a file name or memory address, in a location accessible to the application security component. This process is depicted in block 304. A suitable location may include, for example, code making up the application itself. For example, the developer node may set a predetermined variable value to the identifier for the selected file, such as "tracked_file=filename.bin." This variable may be compiled and encoded with other program code and the security component to make up the integrated application. In the alternative, the developer node may store the identifier in a different location that is, or will be, accessible to the security component when operating on the targeted client devices. For example, the developer node may cause the identifier to be stored in a remote online database.

After development of the selected file is completed and the file is ready for release, the developer node may cause a baseline signature of the file to be generated 306, using any suitable cryptographic file hashing algorithm. For example, the file signature may be generated using a cryptographic MD5, SHA-1, or SHA-2 hash. In the alternative, a different hashing algorithm may be used. The selected hashing algorithm should result in a relatively compact hash output, for example, less than a kilobyte, or less than a few kilobytes, as necessary to provide for a secure and unique hash signature. A secure and unique hash signature is one that will not result in collisions, that is, the same hash output, from different input files, and that cannot be cracked or reverse-engineered using a reasonable amount of computing resources. Hashing techniques tend to evolve over time in response to changing computing environments, and the present technology may use any hashing technique suitable for its intended environment.

The file signature resulting from the hashing process may be registered 308 with a designated administrative node, for example, by securely transmitting from the developer node to a designated network-accessible secure database. In embodiments that use more than one hashing method, an indicator of the hashing technique used to obtain the file signature may similarly be registered. For greater security, the file signature should not be included in the published software application, nor should any readily discernable indication of the hashing technique be recorded there. However, the security component may include encrypted, obfuscated and compiled program code for computing a hash signature of the target application file or files. In the alternative, or in addition, this program code may be configured to require a key or code portion from a remote source, for example, from the administrative node, to enable client-side operation of the hashing algorithm.

In addition, after all application components are completed and ready for publishing, the developer node may integrate the security component with other application parts to provide an integrated application, as depicted in block 310. The security component should include those parts of the application that provide client-side software signature tracking functions, for example, as described in connection with FIG. 4 below. The security component may include other security functions, for example, device fingerprinting or profiling, or security key access control, in addition to file signature tracking. The security component may be obfuscated so that its presence and location of its parts cannot readily be detected in the integrated application. In the final step 312, the developer node may then publish the integrated application version through any suitable distribution channel for installation on a targeted population of client computing devices.

Figure 4:
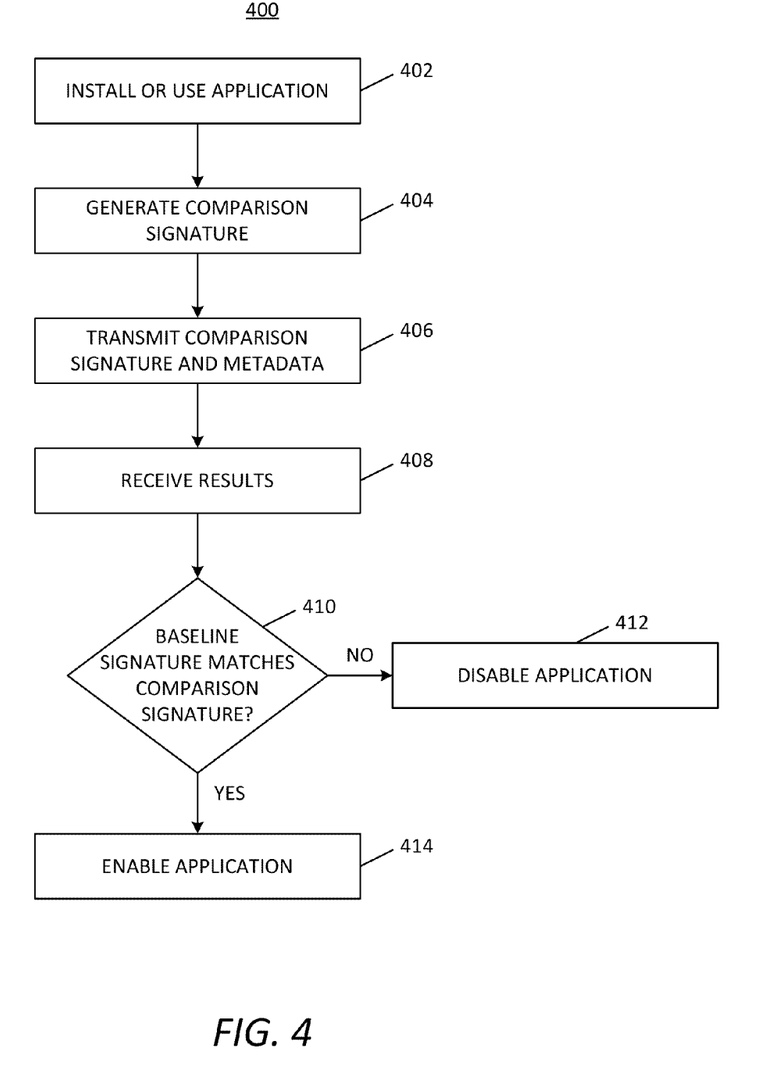
FIG. 4 is a process flow chart showing one embodiment of a method according to the invention for software signature tracking at a client node.

FIG. 4 shows an example of a method 400 for software signature tracking at a client node. The method may be initiated by occurrence of a triggering event 402, for example, installation of an application including the security component on a client node, or a defined use of such an application at the client node. The application should be programmed such that occurrence of the event triggers operation of the signature tracking component, via the application program logic.

Therefore, in response to occurrence of one or more triggering events, the signature tracking component operating on the client note may cause the client node to compute a hash signature of the target file or files 404 as directed by its internal program logic. This signature will be used for comparison to an earlier baseline signature stored in a signature database, and is therefore sometimes referred to herein as a "comparison signature." To make reverse-engineering of the hashing algorithm more difficult, operation of the hashing algorithm may be obfuscated, such as, for example, by performing one or more of steps of a hashing algorithm at different apparently unrelated times. In the alternative, or in addition, operation of the hashing algorithm may require that a key or code portion be transmitted to the client node enabling operation of the hashing algorithm. For example, the administrative node may transmit one or more encrypted variable values to the client for use in the hashing algorithm. As a further security precaution, transmission of the key or code portion from the administrative node may be conditioned on the client successfully transmitting a signal, or a sequence of signals, to the administrative node indicating the application is installed and operating on a client of a targeted type or having a known authorized identity. For example, a machine fingerprint indicating a known device may be required from the client.

In the next step 406, the client node may then transmit the comparison signature to the administrative node together with metadata indicating the circumstances under which the comparison signature was generated. Such metadata may include, for example, a time and date the comparison fingerprint was generated, an application and version identifier, a client machine fingerprint or other identifier, a user name or identifier for a registered user of the client application, and any other information of interest for tracking purposes. The comparison fingerprint may be protected using any suitable encryption and/or obfuscation method before being transmitted to the administrative node. In steps 408 and 410, the administrative node may compare the comparison fingerprint to a baseline fingerprint for the identified application and version, and transmit comparison results to the client. In the alternative, the administrative node may transmit the baseline signature to the client for comparison at the client node. Either way, the value of both the comparison fingerprint and the baseline fingerprint should be carefully protected to decrease the risk that a unauthorized software version could be modified to cause a copy of the baseline signature to be transmitted to the administrative node instead of an actual comparison signature generated by the security component at the client node.

In one embodiment, the client machine fingerprint or other identifier may be generated at the client node by means of additional instructions appended to the code that generates the comparison signature. In one embodiment, the client machine fingerprint or other identifier may be generated from a combination of non-user-configurable device identifiers encoded by different manufacturers of devices or sub-components that are installed at the client node. Non-user-configurable device identifiers may be digital indicia stored in read-only memory, for example, encoded bits that represent a manufacturer name, model, version, serial number, or a performance specification or rating. By generating the client machine fingerprint or other identifier from a combination of indicia from different manufacturers, the resulting identifier achieves a high probability of uniquely identifying the client node.

Transmitting comparison results to the client may increase the risk that the value of the baseline fingerprint can be discovered. Accordingly, in some embodiments, comparison results—i.e., any indication of whether or not the comparison signature matches the baseline signature—are never provided to the client node from which the comparison signature originated. In these embodiments, the software signatures are used primarily for tracking purposes and only for selective, non-automated license enforcement. In other embodiments, comparison results are transmitted from the administrative node to the client node, which receives them at block 408.

If the results indicate a mismatch between the comparison signature from the client and the baseline signature stored for the indicated application version, the client, operating under control of the security component, may disable operation 412 of a portion or all of the application installed on the client node. For example, the security component may set variable value causing application modules to terminate abnormally, or limiting their functionality. Disabling may also be accomplished by restricting access to required network resources. For example, in a multi-user gaming application, a client for which a signature mismatch occurred may be prevented from accessing the network-hosted gaming resource to access on-line games. Network-level disabling need not involve any action on the part of the client beyond transmitting the comparison signature and metadata to the administrative node.

Conversely, if the results indicate a match, the client, again operating under control of the application security component, may enable full operation 414 of the application at the client node. Again, this may occur through some client-side action, or at a network resource node by permitting access to a network resource only after a signature match has been confirmed through the foregoing process. In the alternative, the client may merely take no action in response to a signal indicating a signature match, thereby permitting normal functioning of the application software on the client node to continue.

Figure 5:
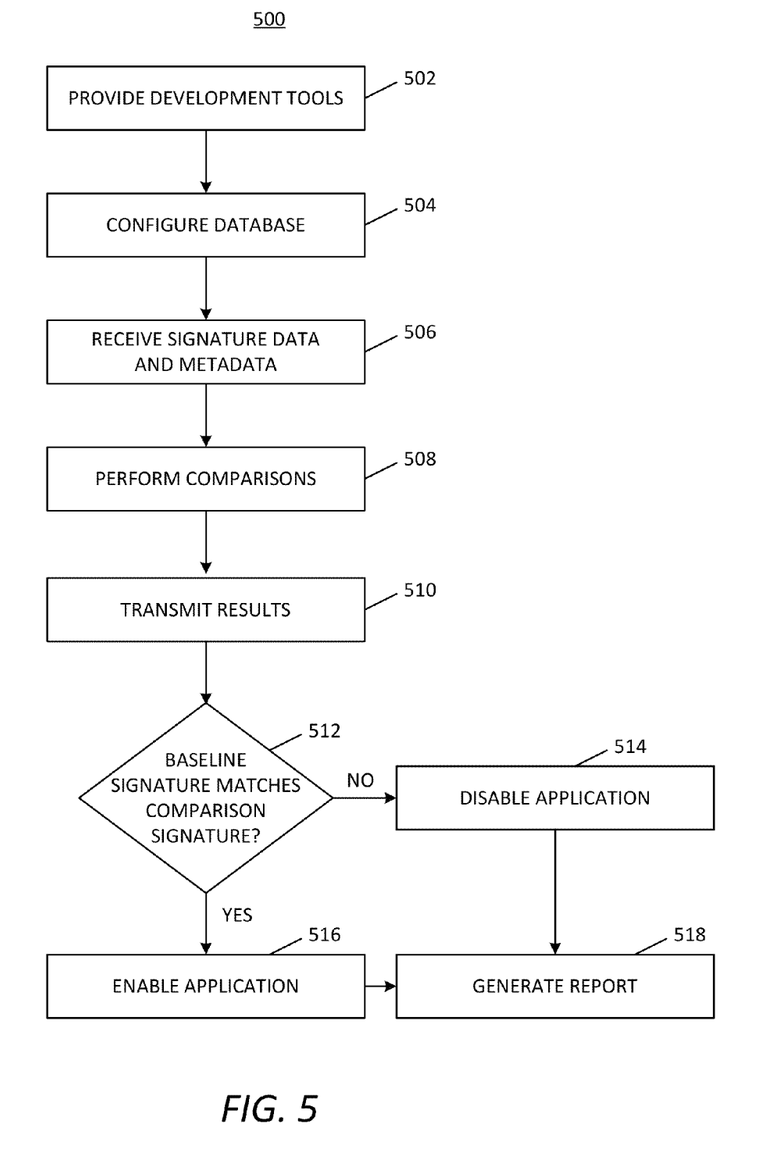
FIG. 5 is a process flow chart showing one embodiment of a method according to the invention for software signature tracking at an administrative node.

Signature tracking may also make use of a remote administrative node that is configured to receive tracking data from numerous distributed clients. FIG. 5 shows an example of a method 500 for software signature tracking at an administrative node. It should be appreciated that the illustrated method discloses processes that may be performed at one or more computers. For example, providing development tools 502 may be performed using a first computer while configuring a database 504 may be performed using a different second computer, and so forth.

As described hereinabove, an administrative node may supply software development tools to be used by a developer node in developing the application that is to be tracked. The development tools facilitate actions performed in method 300, as described above in connection with FIG. 3. Providing these tools may include developing software that performs the functions described herein and transmitting or otherwise distributing such software to developer nodes.

Another administrative node action may include configuring a database and database server 504 to manage software signature data. The database may be configured to perform conventional database functions related to storing, managing, and retrieving software signature. Any suitable database platform may be used. In addition, the administrative node may secure data served from the database by first passing the data through an encryption and/or obfuscation layer. Conversely, the administrative node may decrypt and/or decode incoming data for the database.

The administrative node also functions to receive signature data and metadata 506 for including in the database, or for comparing to stored signature data, from at least two distinct client types. One of these client types includes developer nodes. Developer nodes provide baseline file signatures and metadata in response to, or related to, release of software versions, as described above. Another of these client types includes client nodes operating applications released from developer nodes. Client nodes provide comparison signatures to the database in response to installation or use of the released software applications on the client nodes.

The administrative node compares 508 incoming comparison signatures to recorded baseline signatures for the same application version identifier. If the application and version identifier are not found in the administrative database, this indicates that the application version is not registered. Therefore the comparison signature may be discarded or saved as a suspicious or unknown record. Unless the signature and metadata came from an authorized developer node, it should not be treated as an authorized baseline signature. The administrative node may record the comparison results and any associated metadata in the database as a comparison record, for later reporting purposes.

When no match can be found 512 for a comparison signature associated with metadata identifying a particular application and version identifier, the comparison signature and metadata may be recorded in the database as a new baseline signature for a suspected unauthorized software version. In addition, the administrative node may transmit a signal to the client that provided the mismatched comparison signature, or to a network resource that services the client, disabling 514 a portion or all of the application on the client node. The administrative node may also retrieve an IP address or other network address for the client that provided the mismatched comparison signature, and any other available data that may be useful for investigating or enforcing license terms against clients using unauthorized software versions.

Conversely, if the comparison signature matches 512 a baseline signature for the same application and version identifier, the administrative node may transmit a signal to the client that provided the matched comparison signature, or to a network resource that services the client, enabling 514 a portion or all of the application on the client node. In the alternative, the administrative node may refrain from any specific enabling or disabling action, permitting normal operation of the application to continue.

Figure 6:
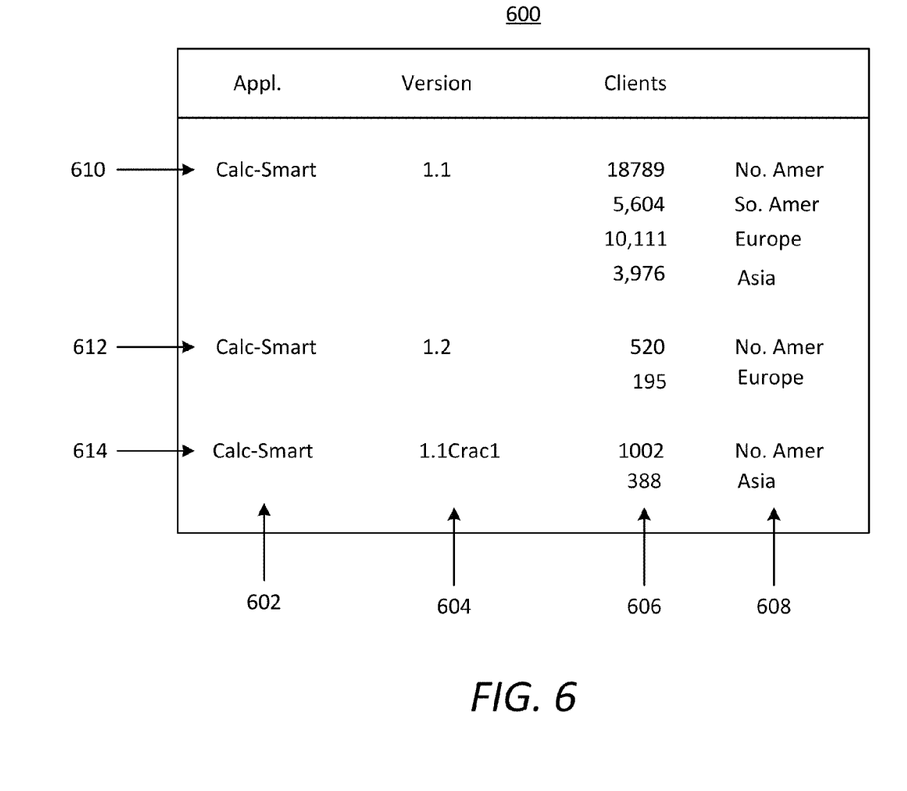
FIG. 6 is a table showing a simplified example of a version tracking report prepared using a method according to the present invention.

Generating version reports 518 may comprise a further function of the administrative node. Such reports may be generated from time to time, in response to requests for reports from developer nodes or in response to predetermined triggers, e.g., detections of an unauthorized software version. Reports may be drawn by the administrative node from database records of comparison results and associated metadata. FIG. 6 shows a simplified example of a version tracking report 600 as may be prepared using the methods disclosed herein. Report 600 may include any plural number of rows and columns, of which the four depicted columns 602, 604, 606, 608 and rows 610, 612, 614 are merely examples. A first column 602 lists text identifiers for a particular software application, which in the present example is the same for all three rows 610, 612, 614. A second column 604 lists version identifiers. By way of example, the first two identifiers indicate authorized versions, while the entry at row 614, column 604 indicates an example of assigned label for an unauthorized application version. Columns 606 and 608 indicate numbers of reporting clients for each version and geographical regions where the reporting clients are deemed to be located, respectively. Reports may be configured so that users may "drill down" to the lowest level of detail supported by the recorded data. For example, by selecting a geographical region a user may cause the administrative node to generate a report showing version copies used in smaller regions such as countries or states. Therefore, using the system and method for software signature tracking, software developers, publishers, and others can track the distribution and spread of both authorized and unauthorized versions throughout any region of interest.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented, unless a specific order is expressly described or is logically required.

Moreover, various aspects or features described herein can be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other computer-readable media for storing information. The term "computer-readable medium" may include, without being limited to, optical, magnetic, electronic, electro-magnetic and various other tangible media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application while remaining, either literally or equivalently, within the scope of the accompanying claims.

What is claimed is:

1. A method for preventing unauthorized use of software, comprising:

recording, using a computer, an indication of at least one selected file of a software application in a memory location accessible to a security component of the software application, in which software application the security component is configured to cause a hash signature of the at least one selected file to be generated in response to a use event for the software application;

hashing the at least one selected file to generate a first file signature;

transmitting the first file signature to a secure network-accessible computer memory for storage and subsequent comparison to at least one subsequent file signature generated via operation of the security component on a client device;

comparing the first file signature to a second file signature generated by the security component in response to a signal arising from use of the software application on the client device;

storing metadata identifying the client device, the software application, and a date that the second file signature is generated, in a database of file signature data;

storing results from comparing the second file signature to the first file signature, in association with an identifier for the client device; and disabling the software application on the client device, in response to determining that the first file signature does not match the second file signature.

2. The method of claim 1, further comprising transmitting the first file signature to the client device for comparison to the second file signature generated on the client device.

3. The method of claim 1, further comprising comparing the second file signature to the first file signature using the security component of the software application.

4. The method of claim 1, further comprising comparing the first file signature to the second file signature in response to a use event for the software application on the client device.

5. The method of claim 4, wherein the signal is caused by installation of the software application on the client device.

6. The method of claim 4, wherein the signal is caused by execution of the software application on the client device.

7. The method of claim 1, further comprising generating a report tracking instances of generations of second file signatures for the software application across multiple client devices.

8. A method for preventing unauthorized use of software, comprising:
   generating a file signature of a designated executable file installed on a client device, using a hashing algorithm, in response to use of an application of which the designated executable file is a component;
   causing the file signature to be compared to an earlier file signature determined for the designated executable file to obtain comparison results indicating whether the file signature matches the earlier file signature by transmitting the file signature to a remote device with metadata (i) describing the application, (ii) including a date that the file signature is generated, and (iii) indicating an identifier for the client device for comparison to the earlier file signature, and receiving the comparison results in response; and
   disabling use of the application on the client device in response to the comparison results.

9. The method of claim 8, wherein disabling use of the application further comprises disabling at least one function of the application in response to comparison results indicating that the file signature does not match the earlier file signature.

10. A non-transitory computer-readable medium encoded with instructions, that when executed by a processor, cause a computer to:
    generate a file signature of a designated executable file installed on a client device, using a hashing algorithm, in response to use of an application of which the designated executable file is a component;
    transmit the file signature to a remote device with metadata (i) describing the application, (ii) indicating a date that the second file signature is generated, and (iii) indicating an identifier for the client device;
    initiate a comparison between the file signature and an earlier file signature determined for the designated executable file to obtain comparison results indicating whether the file signature matches the earlier file signature; and
    disable use of the application in response to the comparison results.

11. The non-transitory computer-readable medium of claim 10, wherein the instructions are further configured to cause the computer to disable at least one function of the application in response to comparison results indicating that the file signature does not match the earlier file signature.

12. The non-transitory computer-readable medium of claim 10, wherein the instructions are further configured to cause the file signature to be compared by transmitting the file signature to a remote device for comparison to the earlier file signature, and receiving the comparison results in response.

13. A system for preventing unauthorized use of software, comprising:
    a computer having a processor;
    memory coupled to the computer and encoded with instructions, that when executed by the processor, cause the computer to:
    generate a file signature of a designated executable file installed on the computer, using a hashing algorithm, in response to use of an application of which the designated executable file is a component;
    generate an identifier for the computer from a combination of non-user-configurable device identifiers encoded by different manufacturers;
    transmit the file signature to a remote device with metadata indicating the identifier for the computer, the application, and a date that the file signature is generated;
    initiate a comparison between the file signature and an earlier file signature determined for the designated executable file to obtain comparison results indicating whether the file signature matches the earlier file signature; and
    disable use of the application in response to the comparison results.

14. The method of claim 1 wherein the memory location is on a remote online database.

\* \* \* \* \*